United States Patent
Larignon et al.

(10) Patent No.: US 10,595,193 B2
(45) Date of Patent: Mar. 17, 2020

(54) METHOD OF PROVISIONING A SUBSCRIBER PROFILE FOR A SECURE MODULE

(71) Applicant: IDEMIA FRANCE, Colombes (FR)

(72) Inventors: Guillaume Larignon, Colombes (FR); Arnaud Danree, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 14/957,906

(22) Filed: Dec. 3, 2015

(65) Prior Publication Data

US 2016/0165433 A1 Jun. 9, 2016

(30) Foreign Application Priority Data

Dec. 4, 2014 (FR) ...................................... 14 61910

(51) Int. Cl.
| | |
|---|---|
| *H04M 3/00* | (2006.01) |
| *H04W 8/20* | (2009.01) |
| *H04W 8/18* | (2009.01) |
| *H04W 4/50* | (2018.01) |

(52) U.S. Cl.
CPC ........... *H04W 8/205* (2013.01); *H04W 8/183* (2013.01); *H04W 4/50* (2018.02)

(58) Field of Classification Search
CPC ..... H04W 8/183; H04W 8/205; H04W 4/001; H04W 8/20
USPC .................................................. 455/418, 419
See application file for complete search history.

(56) References Cited

U.S. PATENT DOCUMENTS

| | | | | |
|---|---|---|---|---|
| 2005/0239504 | A1* | 10/2005 | Ishii ................... | H04M 1/72525 455/558 |
| 2005/0250516 | A1* | 11/2005 | Shim ....................... | H04W 8/18 455/456.1 |
| 2012/0190354 | A1* | 7/2012 | Merrien ................ | H04W 4/001 455/422.1 |
| 2013/0012159 | A1 | 1/2013 | Lodeweyckx | |
| 2013/0132854 | A1* | 5/2013 | Raleigh ................. | G06F 3/0482 715/738 |
| 2013/0217361 | A1 | 8/2013 | Mohammed et al. | |

(Continued)

FOREIGN PATENT DOCUMENTS

EP 2615543 A1 7/2013

OTHER PUBLICATIONS

Ex. Sebastian Petit, Preliminary Search Report dated Oct. 5, 2015 for French patent application No. 1461910; pp. 1-2.

(Continued)

*Primary Examiner* — Khoi H Tran
*Assistant Examiner* — B M M Hannan
(74) *Attorney, Agent, or Firm* — MH2 Technology Law Group, LLP

(57) ABSTRACT

Described are methods and systems for provisioning a subscriber profile in a secure module, such as a SIM card. The methods and systems may perform operations that may include receiving a request for provisioning a subscriber profile accompanied by parameters of a mobile terminal associated with the subscriber profile, and configuring the terminal when notification is received of the profile being activated, the notification coming from the secure module. Variations of the systems and methods are applicable to terminals including a secure module for hosting a subscriber profile to a mobile communications network.

12 Claims, 2 Drawing Sheets

(56) References Cited

U.S. PATENT DOCUMENTS

| | | | | |
|---|---|---|---|---|
| 2013/0217389 A1* | 8/2013 | Punz | ............ | H04W 60/04 |
| | | | | 455/435.1 |
| 2013/0303122 A1* | 11/2013 | Li | ............ | H04W 8/20 |
| | | | | 455/411 |
| 2013/0344864 A1* | 12/2013 | Park | ............ | H04W 8/18 |
| | | | | 455/432.3 |
| 2014/0004827 A1* | 1/2014 | O'Leary | ............ | H04W 8/22 |
| | | | | 455/411 |
| 2014/0011541 A1* | 1/2014 | Cormier | ............ | H04W 8/183 |
| | | | | 455/558 |
| 2014/0235210 A1* | 8/2014 | Park | ............ | H04W 12/04 |
| | | | | 455/411 |
| 2015/0172997 A1* | 6/2015 | Griot | ............ | H04W 48/08 |
| | | | | 455/411 |
| 2015/0181419 A1* | 6/2015 | Mistry | ............ | H04W 8/18 |
| | | | | 455/419 |
| 2015/0289140 A1* | 10/2015 | Rudolph | ............ | H04W 8/205 |
| | | | | 455/411 |
| 2016/0021529 A1* | 1/2016 | Park | ............ | H04W 8/205 |
| | | | | 455/410 |
| 2016/0142906 A1* | 5/2016 | Park | ............ | H04W 8/205 |
| | | | | 455/419 |
| 2016/0249203 A1* | 8/2016 | Mazali | ............ | H04W 8/205 |
| 2019/0026092 A1* | 1/2019 | Gao | ............ | H04W 12/10 |

OTHER PUBLICATIONS

English translation of Chinese Office Action issued in corresponding Chinese Patent Application No. 201510884141.9 dated Nov. 5, 2019, pp. 1-10.

\* cited by examiner

METHOD OF PROVISIONING A SUBSCRIBER PROFILE FOR A SECURE MODULE

CROSS-REFERENCE TO RELATED APPLICATIONS

This application claims priority to French Patent Application No. 1461910 filed on 4 Dec. 2014, the entire contents of which is hereby incorporated by reference.

The field of the invention relates to a method of provisioning a subscriber profile to a terminal having a secure module; and it also relates to the terminal and to a server for provisioning subscriber profiles.

At present, a mobile communications terminal has a secure module for hosting one or more profiles of a subscriber to services. In a cellphone, the basic service is provided by a mobile network operator (MNO) giving access to a mobile communications network in order to exchange information remotely.

Nevertheless, provision is also made to enable a terminal to give access to other services from third parties, such as for example a pay-TV service or a payment service, e.g. a virtual bank payment card. The secure module then hosts a plurality of profiles for accessing various services.

A subscriber "profile" designates at least the identifiers of the subscriber's line, the cryptographic data needed to authenticate the subscriber with the operator of the service (cryptographic keys and algorithms), and the identifier's of the operator.

When a subscriber seeks to renew a service, it is necessary to update, add, or replace a subscriber profile in the secure module.

In a cellphone, the secure module is a removable card known as a subscriber identity module (SIM), and also known more generically as a universal integrated circuit card (UICC), which card is replaced in order to benefit from access to a mobile communications network of another operator.

For a machine to machine (M2M) type terminal, the secure module is hard-wired to the terminal and is therefore not removable. It is commonly referred, to as an embedded universal integrated circuit card (eUICC). The terminal may be a vehicle, a telemetry device, or any apparatus for acquiring data remotely. Provision is made for the manufacture of the terminal to provide a solution for remotely updating software of the secure module. For that purpose, the operator of the service embedded in the terminal has secure wireless communication means available for accessing the secure module and for deploying new subscriber profiles.

Solutions are Known in the state of the art for remotely updating a secure module, whether or not it is removable.

American patent application US 2013/0012159 A1 describes a solution for deploying a new profile in a removable secure module. The module has a priming first profile in order to establish first communication enabling a second operator profile to be loaded. When the second profile is activated, the first profile is configured to be in a dormant state.

American patent application US 2014/0134981 A1 describes a method of updating the subscriber's profile or for loading a plurality of profiles in a hard-wired secure module. In particular, it describes the functional blocks of the secure module and of the server for provisioning subscriber profiles that enable a subscriber profile to be prepared and sent in secure manner, as specified by the global system for mobile communication association (GSMA).

Those solutions do not provide for updating parameters of the operating environment of the terminal, which parameters are associated with the preceding operator. For example, the terminal needs to be configured with parameters associated with its subscriber profile in order to connect with services of the operator, e.g. an IP address on the Internet or an access point address of the mobile communications network of the operator in order to access a data network of the fourth generation (4G) type. This is problematic since the parameter mismatch between the terminal and the secure module can prevent the first connection to the server of the new operator. For example, if the updating notification is sent via the data network, the operator may lack that information, thereby damaging continuity of service for the client.

Another problem may be that the terminal remains configured with the visual appearance of the initial operator loaded by the manufacturer or the service operator. Under such circumstances, the parameters of the terminal may be the image on starting the terminal, the logo of the operator, and the color codes of the interface. The parameter mismatch between the terminal and the secure module can mislead the client.

There therefore exists a need to solve the above-mentioned problems and to propose a global solution for updating a terminal that guarantees not only that the secure module is updated but also that the parameters of the terminal are updated, so as to guarantee at least continuity of service for the client.

More precisely, the invention relates to a method of provisioning subscriber profile to a terminal that has a secure module for hosting the profile of a subscriber to a mobile communications network and to an operating environment of the terminal.

According to the invention, the method comprises the following successive steps executed by the terminal:
  receiving a provisioning request from a remote server comprising at least, the subscriber profile and parameters of the terminal associated with the profile;
  loading the subscriber profile into the secure module;
  receiving from the secure module a first notification of activation of the profile in the secure module; and
  configuring the operating environment with the terminal parameters triggered by the first notification.

In a variant, after loading, the method comprises receiving a request from the remote server to activate the profile, and the first notification of activation is a response to the activation request made by the secure module via a first secure channel.

In a variant, after configuration, the method comprises executing a procedure between the secure module and the remote server for a second notification of the activation of the profile in the secure module.

In a variant, between configuration and the second notification procedure, the method comprises receiving a request to restart the terminal.

More precisely, the parameters of the terminal comprise at least the access point name for a connection to a data network of the mobile communications network.

In a variant, the provisioning request further comprises a signature of the profile and parameters for an authentication request by the secure module.

Furthermore, loading is performed after receiving a notification of authentication of the signature.

In a variant, the provisioning request is received via a second secure channel between the terminal and the remote server, the second secure channel involving an exchange of SMS, CAT_TP, or HTTPS type.

More precisely, the parameters are specific to an identifier of the terminal.

In a variant, prior to reception, the method further comprises the secure module determining the identifier of the terminal and sending the identifier of the terminal to the remote server.

In a variant, after loading, the method further comprises receiving the notification of the loading of the profile from the secure module, and then receiving a request to activate the second profile coming from the remote server.

The method provides a terminal including a secure module for hosting a profile of a subscriber to a mobile communications network and an operating environment or the terminal.

According to the invention, the terminal comprises:
 reception means for receiving a provisioning request coming from a remote server and comprising at least the subscriber profile and parameters of the terminal associated with the second profile;
 loader means for loading the profile in the secure module and reception means for receiving a notification of activation of the profile in the secure module; and
 configuration means for configuring the terminal with the parameters of the terminal on receiving the notification of activation from the secure module.

The invention also provides a server for provisioning a subscriber profile to a mobile communications network, the server comprising a profile register, processor means for initiating the provisioning of the profile to a subscriber terminal and for creating a provisioning request, and sender means for sending the provisioning request to the terminal.

According to the invention, the server further comprises:
 a register of terminal parameters associated with the subscriber profile; and
 the provisioning request of the terminal comprises at least the profile of a subscriber and the parameters of the terminal associated with the profile. More precisely, the parameters of the terminal represent at least the access point name for connection to a data network of the mobile communications network of the profile of the associated subscriber.

In a variant, the server comprises reception means receiving an identifier of the terminal.

By means of the provisioning method of the invention, the terminal is configured as a result of activating the profile that has been loaded in the secure module. The configuring of the terminal is triggered on the terminal receiving the first notification of activation of the profile coming from the secure module.

Thus, the terminal is configured with the parameters of the operator of the telephone network before sending activation notifications to a remote provisioning server or a server of the operator's communications network.

The method makes it possible to ensure that notifications for a remote server are sent correctly. It also makes it possible to use the data network of the new operator for sending the activation notification.

Other characteristics and advantages of invention appear more clearly on reading the following detailed description of embodiments of the invention given as nonlimiting examples that are shown in the accompanying drawings, in which.

The invention applies to provisioning a profile of a subscriber to a service together with parameters of the terminal associated with the subscriber profile. The invention seeks to avoid problems of matching between the profile in the terminal of the subscriber to the service and the configuration of the terminal. The invention sets out to describe the method of provisioning a new subscriber profile to a mobile terminal together with the parameters of the mobile terminal that are associated with said new profile.

Figure 1:
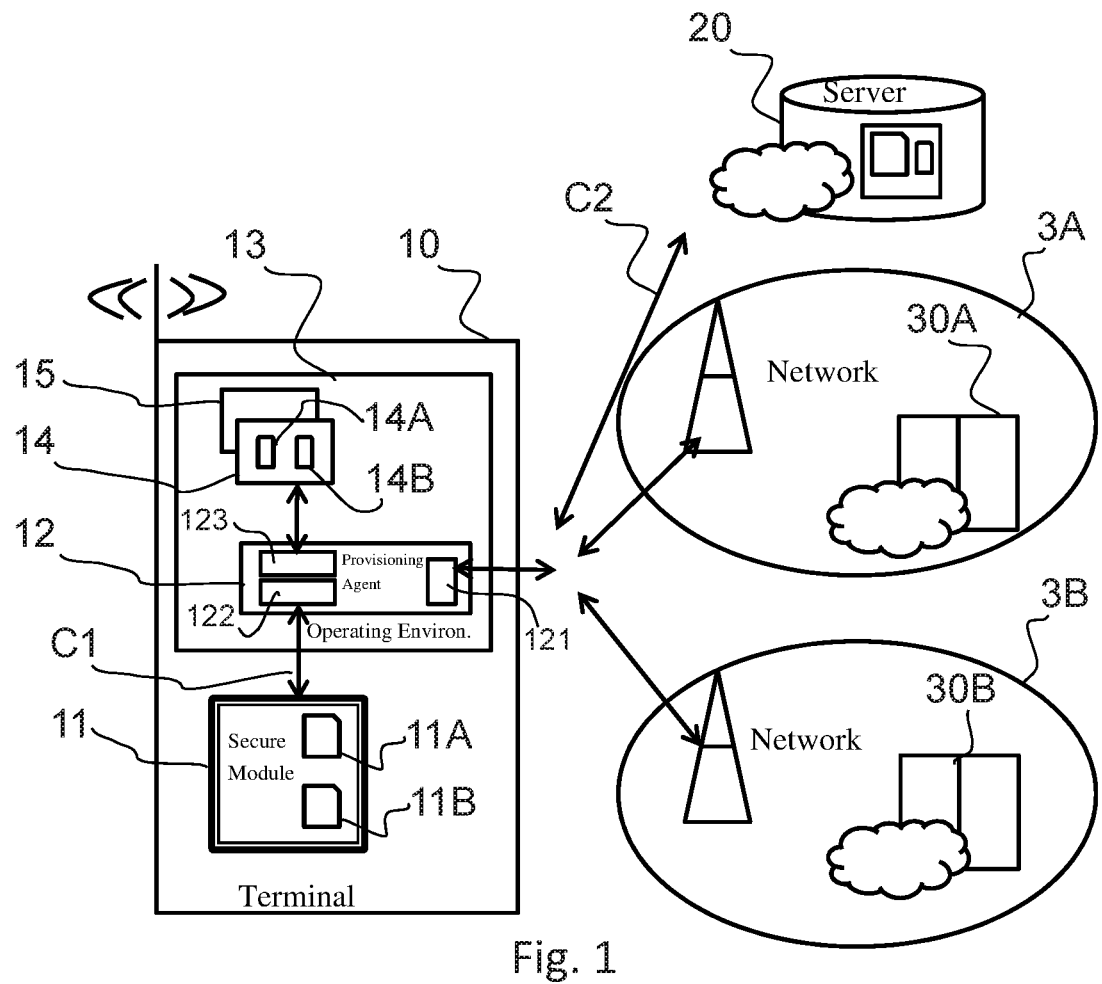
FIG. 1 is a diagram of communications between a terminal hosting a secure module and the communications network of an operator.

FIG. 1 is a diagram of an embodiment representing the ecosystem in which the invention is used. It applies to a mobile terminal 10 having a secure module 11 for hosting subscriber profiles. In this embodiment two profiles 11A and 11B are involved, the first profile 11A being a profile that is activated in the secure module, and the profile 11B being a profile that is to be provisioned in the secure module 11 in order to replace the profile 11A or else in order to add a second active profile.

The secure module 11 is preferably an integrated circuit of the UICC type for performing cryptographic functions serving in particular to authenticate the secure module 11 with a service 3A, 3B. The secure module 11 could equally well be a software and hardware zone of a terminal that is recognized as being protected and trusted, also known as a trusted execution environment (TEE). The secure module 11 communicates with a remote server 24 for provisioning subscriber profiles in order to receive the subscriber profiles.

The description begins with a description of the terminal 10 and of the secure module 11. The terminal 10 is a mobile communications device, e.g. of the cellphone type, an embedded telemetry device, or a remotely-managed installation. In this embodiment, the secure module hosts a first subscriber profile 11A, and the terminal is configured with first parameters 14A. An operating environment 13 enables the terminal 10 to operate and enables it to operate with a service 3A of an operator by using the profile 11A and the parameters 14A. The operating environment is configured by configuration files, and these configuration files include the terminal parameters 14A, 14B that are associated with the subscriber profiles 11A, 11B.

In order to operate the security functions, the secure module 11 has security domains for managing communications protocols with external entities, such as for example: the terminal 10; a remote server 24 provisioning subscriber profiles; or mobile communications networks; in order to manage subscriber profiles and in order to host the identifier of the secure module and cryptographic data, e.g. such as an identifier used for the purposes of provisioning subscriber profiles, keys for personalizing the secure module, authentication keys, and session keys.

The secure module 11 may be removable and may be in SIM card format the purpose of being inserted in the mobile terminal 10. The terminal may be a cellphone or it may be a multimedia tablet. The services 3A, 3B with which the secure module 11 authenticates itself are then communications networks 3A, 3B for cellular mobile telephony.

In another embodiment of the so-called M2M type, the secure module 11 (of eUICC type) is hard-wired in the terminal 10 and is not removable. The secure module 11 is an integrated circuit capable of authenticating itself with one or more mobile communications networks 3A, 3B, of the cellular network type. The terminal may be a cellphone, a self-propelled vehicle, or telemetry apparatus, for example.

It should be observed that the services 3A, 3B may be pay services requiring the user to be authenticated by means of a profile hosted in the secure module, such as for example a pay audiovisual service, a satellite telecommunications service, or a telemetry service making use of a private data network.

In the context of the mobile communications networks 3A, 3B, they are operated by respective operators and each of these networks provides a voice type communications server, a short message service (SMS) type server, and also a data network 30A, 30B. The term "data network" 30A, 30B is used of a mobile telephony operator to mean a 2G, 3G, 4G, or long term evolution (LTE) network. It is a communications network in which data is transmitted in packets, i.e. a network of Internet protocol type that requires access to a gateway of the operator, which gateway has an address that is known to the terminal 10. The communications protocols of data networks 30A, 30B of LTE type are defined by specifications issued by standards organizations. By way of example, these may be the standards issued by the European Telecommunication Standards Institute (ETSI) or by the third Generation Partnership Project (3GPP).

The access to the operator's gateway is given by the parameters 14A, 14B in the operating environment 13 of the terminal 10. In order to access a data, network 30A, SOB, the parameters 14A, 14B of the terminal are access point names (APNs). The parameters 14A, 14B may comprise a plurality of access point names having privileges that differ depending on the applications used in the mobile terminal 10.

By way of example, the operating environment 13 may be an environment of the iOS, Android, LINUX (registered trademarks) type or of any other type enabling the terminal 10 to operate. The operating environment includes configuration files for managing the parameters of the terminal 10.

More precisely, the parameters 14A, 14B of the terminal are associated with the profile of the subscriber hosted in the secure module 11, As mentioned above, they may be the access point data specific to the operator's mobile communications network 3A, 3B, but they may also be a visual appearance of the operating environment 13 specific to the operator (e.g. a logo, a color, animations, photos) or parameters associated with an application for accessing one of the operator's services.

It should be understood that the parameters 14A, 14B of the terminal are associated with respective subscriber profiles 11A, 11B, in particular because the parameters of the terminal 14A are generally not compatible with the subscriber profile 11B, and vice versa the parameters of the terminal 14B are not compatible with the profile 11A. They are parameters that cannot be used with a service other than the operator's service. These parameters are defined by the operator of the profile of the subscriber with which the operator is associated.

Furthermore, the terminal parameters 14A, 14B and requests for configuring the parameters 14A, 14B in the terminal are specific to the operating environment running on the terminal in question.

Furthermore, the operating environment 13 hosts a provisioning agent 12. The provisioning agent 12 is a communications intermediary between the remote profile provisioning server 20 and the secure module 11. On receiving requests or notifications coming from the remote server 20, it serves in particular to execute appropriate commands between the terminal 10 and the secure module 11. Conversely, on receiving requests or notifications coming from the secure module 11, it enables the appropriate commands to be executed between the terminal 10 and the remote server 20.

The provisioning agent 12 is an entity of the terminal that collaborates with the remote server 20. It is transmitted and maintained by the same entity as is in charge of the remote server 20. This entity may be the operator of a telecommunications service, the manufacturer of the secure module, the manufacturer of the terminal, or a third-party service operator. The provisioning agent 12 is a software application hosted, by the operating environment 13 of the terminal, e.g. of Java type, making use of application methods and functions for receiving requests, notifications, data, and commands to be exchanged with the secure module 11 and the remote server 20.

The provisioning agent 12 can communicate with the secure module 11 via a first secure channel C1. For this purpose, it includes means 122 for receiving and sending data. This is a secure communications channel making use of the application protocol data unit (APDU) protocol as defined in the ISO/IEC standard 7816-4. The standard defines the exchanges comprising requests and responses between the terminal 10 and the secure module 11. Mention may also be made of the GlobalPlatform v.2.2.1 standard, which defines a framework for exchanges in order to access secure domains in a secure module. In particular, the standard defines specifically APDU commands for transmitting data between the terminal 10 and the secure module 11, which exchanges may be initiated by an application of the terminal or of a remote profile provisioning server.

The secure module 11 can communicate via the provisioning agent 12 with the remote server 20 over a second secure channel C2. This second secure channel C2 makes use of SMSs, the card application toolkit transport protocol (CAD_TP), or the hypertext transfer protocol secure (HTTPS) protocol. Example, secure module 11 and the provisioning agent 12 may make use of communications protocols such as those standardized in the following standards: ETSI TS 102 226; 3GPP TS 31.111; or 3GPP TS 31.116. By way of example, the secure channel is set up in a mutual authentication stage by means of cryptographic data provisioned in a secure domain of the secure module 11.

Figure 2:
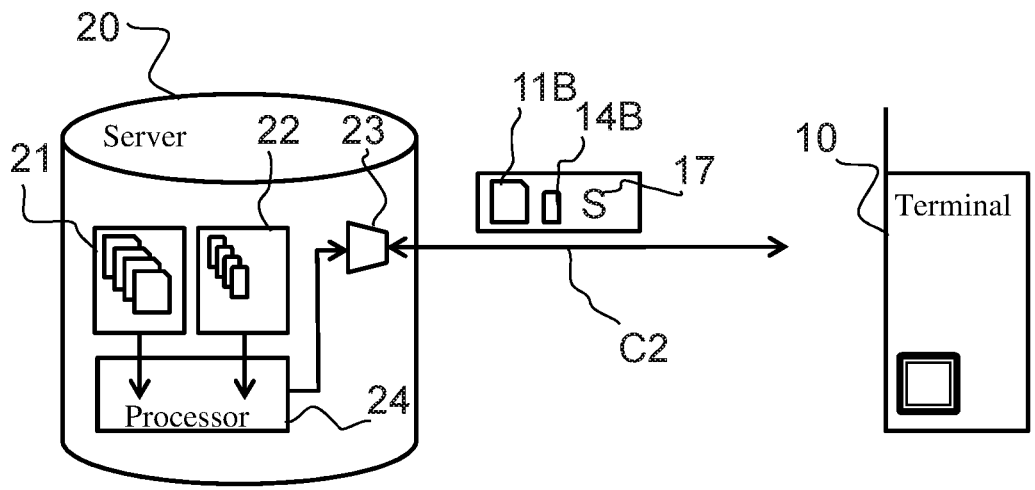
FIG. 2 shows in greater detail a subscriber profile provisioning server for provisioning a secure module.

In the context of provisioning a subscriber profile in the secure module, the server 20 or the secure module 11 initiates a procedure for exchanging a subscriber profile. FIG. 2 shows in greater detail the functions of a remote server 20 for provisioning in a secure module of eUICC type.

The server 20 for managing a profile of a subscriber to a mobile communications network has means for preparing a subscriber profile and the provisioning request, and means for transmitting to the secure module 11.

For this purpose, a register 21 includes subscriber profiles 11A, 11B to a mobile communications network. The register is updated by the operator of the mobile communications network. A profile contains the data used to enable a subscriber profile to access and use the operator's server, and in particular: the subscriber's international mobile security identity (IMSI); the authentication keys; a mobile network operator secure domain (MNO-SD); and a network access application (NAA).

When provisioning in a secure module that is hard-wired to the terminal, the structure of a subscriber profile provisioned in the secure module 11 is known as an issuer security domain profile (ISD-P) and it is specified in the GSMA standard "Remote provisioning architecture for embedded UTCC technical specification", version 2.0. The subscriber profile contains at least the information as specified in the GSMA standard.

Furthermore, in the invention, the server 20 has a register 22 of terminal parameters 14A, 14B associated with the profile of a subscriber. These parameters depend on the model of the terminal, which is defined as a function of a manufacturer's model or of an international mobile equipment identity (IMSI) of the terminal, for example. The identifier is preferably unique to the terminal 10 and it may be associated with a specific manufacture's model known to the remote server 20. The operators of the mobile communications network 3A, 3B establish the parameters 14A, 14B that are associated with their subscriber profiles as a function of the identifiers of terminals.

Furthermore, the server has processor means 24 for initiating the provisioning of the profile to a subscriber terminal and for creating a request for provisioning a subscriber profile that is to be sent to the secure module. The provisioning may be initiated by the operator or by the subscriber. The means for preparing the request for provisioning a subscriber profile are known as "subscriber manager data preparation" (SM-DF) in the GSMA standard.

The server 20 has means 23 for setting up a secure exchange protocol with the secure module via the terminal 10. These, communication means are referred to in the GSMA standard as "subscription manager secure routing" (SM-SR). As mentioned for the secure module, the server 20 may set up the secure channel C2 with the secure module 11, which channel may be of the HTTPS, CAT_TP, or SMS type. Naturally, the terminal 10 and the secure module 11 include means suitable for performing the reciprocal operation for the secure channel C2 with the server 10.

It should be observed that a software entity that is the reciprocal to the SM-SR entity of she server is present, in the secure module 11 in order to set up the exchange protocol. This entity is referred to as an issuer security domain root (ISD-R) in the GSMA standard.

In the invention, the provisioning request of the terminal comprises at least the profile 11B of a subscriber and the parameters of the terminal 14B associated with the profile HE. The parameters 14A, 14B of the mobile terminal may be prepared by the operator together with the subscriber profile 11A, 11B or while preparing the request for provisioning the secure module 11 that is to be provisioned by the server's SM-DP.

Example, the provisioning request requires the creation of a subscriber profile in the secure module, and in order to be executed it may include the APDU command "INSTALL COMMAND" for the terminal 10 in order to install the profile 11B in the secure module 11. The provisioning request provides for a response from the secure module and from the execution status of the command.

Whatever the way in which the parameters 14B of the mobile terminal are prepared in order to provision them, it is important to observe that they are sent with the same request for provisioning the subscriber profile 11B with which they are associated, or during the same protocol for provisioning the subscriber profile 11B. This makes it possible to provision the terminal 10 early with the corresponding parameters 14B in order to activate the provisioned profile 11B.

It should also be observed that in a variant, the provisioning request may be accompanied by a signature 17 of the subscriber's profile 11B and by the terminal parameters 14B in order to enable the secure module 11 to perform authentication.

Figure 3:
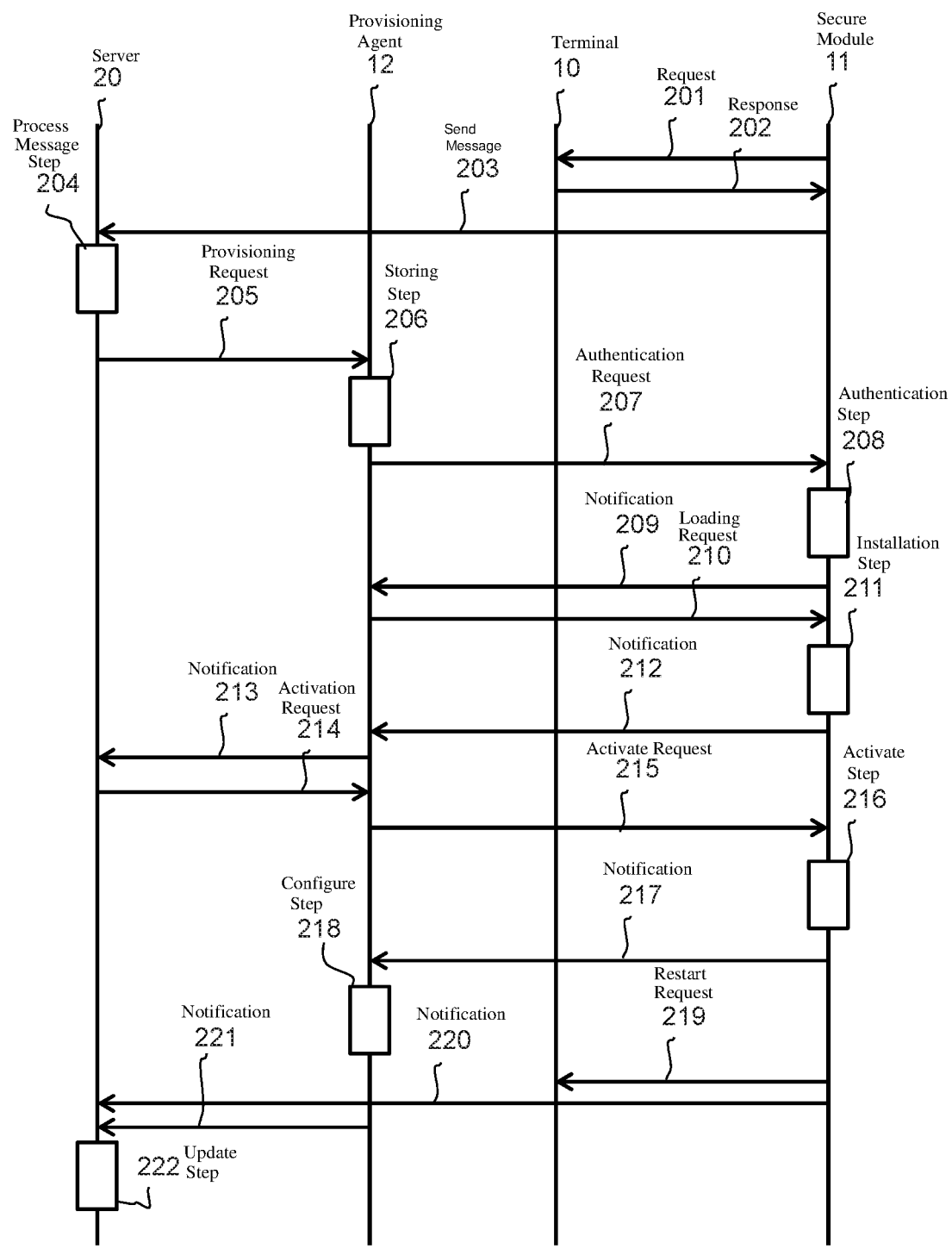
FIG. 3 shows a sequence stream of the method for provisioning the secure module and the terminal.

FIG. 3 shows the sequence stream of the method of provisioning the subscriber profile 11B and the terminal parameters 14B. The secure module 11 contains an active subscriber profile 11A, and the mobile terminal 10 is configured with the parameters 14A.

Before beginning to provision a second subscriber profile, it is necessary to make sure that the remote server 20 has knowledge of the model of the subscriber's terminal 10. By way of example, the identifier of the model of the terminal may be the IMEI number. In a first situation, the remote server 20 receives the identification information of the terminal 10 from the operator. In a second situation, the secure module 11 initiates a request 201 in order to receive an identifier of the terminal 10. The terminal 10 transmits the identifier of the terminal 10 by means of a response 202 to the secure module 11.

Thereafter, the secure module 11 sends the identifier of the terminal to the remote server 20 by a send message 203, via the secure channel C2.

The remote server 20 then acts during a step 204 to process the message containing the identifier of the terminal and it determines the parameters of the terminal to be associated with the secure module 11. The remote server 20 has a database containing a plurality of terminal configuration parameters as a function of an operator.

In a variant of the method, provision may be made for the remote server 20 hosting the means 24 for processing the provisioning request (the SM-DP entity) to receive the terminal parameters 14B via a secure communications channel from another server of the operator of the subscriber profile.

When the remote server 20 receives a demand for provisioning a second subscriber profile 11B for loading into the secure module, a provisioning request is prepared by the remote server 20. The request contains the subscriber profile 11B, the terminal parameters 14B, optionally together with a signature of the profile 11B and also the parameters 14B with a certificate from the secure module 11.

The remote, server 20 transmits the provisioning request 205 to the provisioning agent 20 via the secure channel C2. The provisioning agent 12 receives the provisioning request 205 from the remote server 20 containing at least the subscriber profile 11B and the terminal parameters 14B associated with the profile 11B.

In a step 206, the provisioning agent 12 temporarily stores in a volatile memory of the mobile terminal 10 the terminal parameters 14B associated with the provisioned second profile 11B.

It should be observed at this stage that the mobile terminal 10 is still configured with the terminal parameters 14A and associated with the subscriber profile 11A that is also activated in the secure module 11.

If a signature is present in the provisioning request, the provisioning agent 12 makes a request 207 to authenticate the signature with the secure module 11.

The secure module 11 authenticates 208 the signature of the subscriber profile 11A and the mobile terminal parameters 14B.

If authentication is successful, the secure module 11 transmits a notification 209 validating the signature 17 with the provisioning agent 12. Otherwise, the provisioning method is suspended.

On receiving the validation notification 209, the provisioning agent 12 sends a request 210 for loading the second subscriber profile in the secure module 11. The terminal parameters 14B are held in memory in the memory of the terminal.

Thereafter, the secure module 11 performs installation 211 in the configuration files of the information of the subscriber profile 11B. During this step 211, a secure domain of the ISD-P type specific to the subscriber profile 11B is installed in the secure module 11.

A notification 212 about the loading status of the subscriber profile 11B is transmitted to the provisioning agent 12. The notification 212 is a response to the request 210. A notification 213 is also provided in response to loading being executed, which notification is sent to the remote server 20 from the provisioning agent 12 via the secure channel C2. The notifications 212, 213 inform the terminal and the remote server 20 of the status of loading the profile 14B in the secure module.

On receiving a valid loading notification 213, the server 20 sends an activation request 214 firstly for activating the subscriber profile 11B in the secure module 11 and secondly for activating the terminal parameters 14B to the provisioning agent 12. The activation request 214 may include an APDU command for executing by the terminal, e.g. of the STORE DATA type, containing activation instructions for the attention of the secure module 11 in order to activate the subscriber profile 11B. Such a request may make provision for an activation execution status response. The activation request 214 also contains instructions so that the provisioning agent 12 configures the terminal parameters 14B.

The activation request 214 may be sent immediately, via the secure channel C2, in response to receiving the loading notification 213, or it may be sent on validation of an additional condition, e.g. a duration or an activation order.

Thereafter, the provisioning agent 12 transmits a request 215 to the secure module 11, requesting it to activate the subscriber profile 11B. This involves executing the APDU command contained in the request 214. The instruction for the provisioning agent 12 to perform configuration of the terminal parameters 14B remains pending.

Thereafter, the secure module 11 performs the operation 216 of activating the subscriber profile 11B, which operation is described by way of example in the above-mentioned GSMA standard. At this stage, the subscriber profile 11B is activated in the secure module, or otherwise the provisioning method is suspended. This operation may make provision for deactivating the subscriber profile 11A. Furthermore, this operation provides for the secure module 11 to respond to the activation command 214 coming from the server 20, the response containing the status of the activation operation in the secure module 11.

The activation notification 217 is transmitted to the provisioning agent 12. This notification may also provide a notification for sending to the server 20. The notification 217 is received from the secure module 11 via the secure channel C1. This notification is the response to the activation command 214 issued by the server 20 and including the activation operation status.

On receiving this notification, the provisioning agent 12 configures 218 the environment of the terminal 10 with the parameters 14B. The parameters 14B are parameters for giving access to a service associated with the operator of the subscriber profile 11B, which has been activated. By way of example, the access point name giving access to a data network of the operator of the subscriber profile 11B is configured in the environment 13 of the terminal 10. The terminal parameters 14A associated with the profile 11A that has just been deactivated remain deactivated. If the profile 11A has not been deactivated, the parameters 14A are kept active in the terminal 10.

The configuration 218 triggered by the notification 217 make it possible to guarantee that the terminal is configured with the configuration that is compatible with the profile that is activated in the secure module. Configuration is performed prior to sending an activation notification to the remote server 20 or to a communications network 3B of the operator.

Once the terminal 10 has been configured 218 with the parameters 14B, the secure module 11 then sends a restart request 219 to the terminal 10 for the operating environment of the terminal. This may be the proactive APDU REFRESH command. The command causes a procedure to be executed for attaching the profile that is activated in the secure module to the network 3B.

Thereafter, the method comprises a procedure 220 for notifying activation between the remote server 20 and the secure module 11 via the secure channel C2. The notification method 220 validates installation of the second profile 11B in the secure module reciprocally with the remote profile provisioning server 20. This notification procedure provides for exchanging messages and it may cause the first subscriber profile 11A to be deleted if it has been deactivated. It may be observed that this notification step complies with the procedure for installing a new profile in the secure module in compliance with the above-mentioned GSMA standard.

In a variant, the notification procedure 220 takes place between the secure module 11 and the remote server of the communications network of the operator of the profile 11B. By way of example, the notification procedure makes use of the access to the data network as configured by the parameters 14B.

After configuration 218 of the terminal, provision is also made to notify 221 activation of the terminal parameters 14B in the operating environment 13 of the terminal 10, going from the terminal to the remote server 20. The notification 221 is associated with the notification 217. The notification 221 is the activation operation status response of the profile 11B in the secure module 11. By means of the invention, this notification may be sent for example via the data network for which access is set by the parameters 14B.

On receiving activation notifications following configuration 218, the remote server 20 updates its registers 21, 22 in order to contain, the subscriber profile that is active in the secure module 11 and the terminal parameters configured in the terminal 10.

By means of the invention, the provisioning method guarantees that the terminal is configured with the operator's parameters before the notifications 220 and 221 are sent to the remote server 20 (or to a remote server of the operator's communications network). This ensures that configurations of the remote servers and of the terminal match. Continuity of service is also ensured.

The invention claimed is:

1. A method of provisioning a subscriber profile to a terminal that has a secure module for hosting the subscriber profile of a subscriber to a mobile communications network and to an operating environment of the terminal, the method comprising the following successive steps executed by the terminal:

receiving a provisioning request from a remote server, the provisioning request comprising the subscriber profile and parameters of the terminal associated with the subscriber profile accompanied by a signature, wherein the parameters of the terminal are specific to configuring the operating environment run by a processor of the terminal, wherein the operating environment comprises information related to a type of operating system that allows the terminal to operate;

sending a loading request to the secure module to thereby load the subscriber profile into the secure module;

receiving an activation request from the remote server to activate the subscriber profile in the secure module and to activate the parameters of the terminal;

transmitting a request to the secure module to activate the subscriber profile when the activation request from the remote server is received;

receiving from the secure module a first notification of activation of the subscriber profile in the secure module; and configuring the operating environment of the terminal with the parameters of the terminal triggered by the first notification such that the configuration of the operating environment is compatible with the subscriber profile activated in the secure module, wherein the successive steps are executed by the processor of the terminal, and wherein the processor of the terminal is external to the secure module and separate from a processor of the secure module.

2. The method according to claim 1, wherein the first notification of activation is a response, to the activation request from the remote server, which is received from the secure module via a first secure channel.

3. The method according to claim 2, wherein the provisioning request is received via a second secure channel between the terminal and the remote server, the second secure channel involving an exchange of SMS, CAT_TP, or HTTPS type.

4. The method according to claim 3, wherein the parameters of the terminal are specific to an identifier of the terminal.

5. The method according to claim 4, wherein, prior to receiving the provisioning request, the method further comprises:

the secure module determining the identifier of the terminal and sending the identifier of the terminal to the remote server.

6. The method according to claim 5, wherein, after the loading step, the method further comprises:

receiving a notification of the loading of the subscriber profile from the secure module, and receiving a request to activate a second profile coming from the remote server.

7. The method according to claim 1, wherein, after the configuring step, the method further comprises:

executing a procedure between the secure module and the remote server for a second notification of the activation of the subscriber profile in the secure module.

8. The method according to claim 7, wherein, between the configuration step and the procedure for a second notification, the method further comprises receiving a request to restart the terminal.

9. The method according to claim 1, wherein the parameters of the terminal comprise at least an access point name for a connection to a data network of the mobile communications network.

10. The method according to claim 1, wherein the provisioning request further comprises a signature of the subscriber profile and parameters for an authentication request by the secure module.

11. The method according to claim 10, wherein the loading step is performed after receiving a notification of authentication of the signature.

12. A terminal including a secure module for hosting a subscriber profile of a subscriber to a mobile communications network and to an operating environment of the terminal, the terminal comprising:

a memory containing instructions; and a processor, operably connected to the memory, that executes the instructions to perform operations for implementing a provisioning agent, the operations comprising:

receiving a provisioning request from a remote server, the provisioning request comprising the subscriber profile and parameters of the terminal associated with the subscriber profile accompanied by a signature, wherein the parameters of the terminal are specific to configuring the operating environment run by a processor of the terminal, wherein the operating environment comprises information related to a type of operating system that allows the terminal to operate;

sending a loading request to the secure module to thereby load the subscriber profile into the secure module;

receiving an activation request from the remote server to activate the subscriber profile in the secure module and to activate the parameters of the terminal;

transmitting a request to the secure module to activate the subscriber profile when the activation request from the remote server is received;

receiving from the secure module a first notification of activation of the subscriber profile in the secure module; and configuring the operating environment of the terminal with the parameters of the terminal upon receiving the first notification of activation from the secure module such that the configuration of the operating environment of the terminal is compatible with the subscriber profile activated in the secure module, wherein the processor of the terminal is external to the secure module and separate from a processor of the secure module.

* * * * *